A. W. TATE.
MILK JAR STAND.
APPLICATION FILED JUNE 6, 1918.
1,280,584.
Patented Oct. 1, 1918.
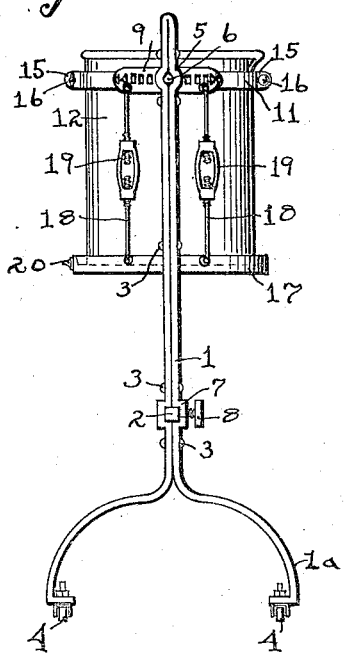
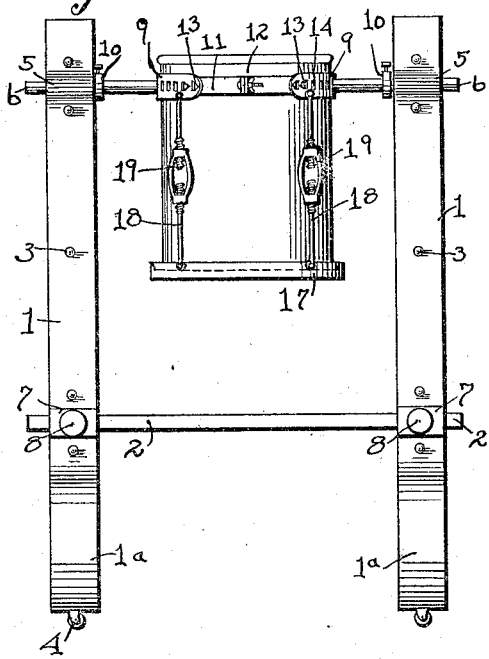
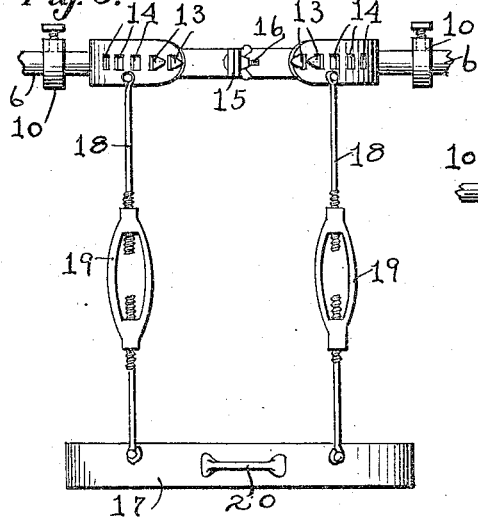
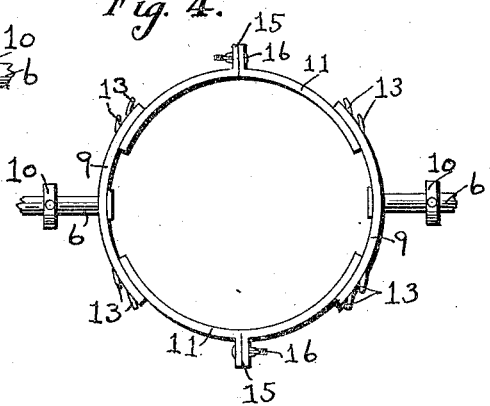
Inventor
A.W. TATE.
By N. S. Hill
Attorney

UNITED STATES PATENT OFFICE.

AARON W. TATE, OF GERTY, OKLAHOMA.

MILK-JAR STAND.

1,280,584.                   Specification of Letters Patent.          Patented Oct. 1, 1918.

Application filed June 6, 1918. Serial No. 238,508.

*To all whom it may concern:*

Be it known that I, AARON W. TATE, a citizen of the United States, residing at Gerty, in the county of Hughes, State of Oklahoma, have invented a new and useful Milk-Jar Stand; and I do hereby declare the following to be a full, clear, and exact description of the invention, such as will enable others skilled in the art to which it appertains to make and use the same.

The present invention relates to a tilting support for milk jars and like containers, and has for its object to provide a device of this character which embodies novel features of construction whereby a heavy milk jar or the like can be supported in an elevated position and in such a manner that it can be easily tilted by a woman or child to pour out the contents thereof.

Further objects of the invention are to provide a stand for tiltably supporting milk jars and the like which is portable and can be readily moved from place to place, which can be quickly adjusted to fit different sizes of jars or receptacles, and which holds the jar securely in position so that there is no danger of accidental breakage or spilling, although the contents of the jar can be removed without difficulty at any time.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a side elevation of a tilting milk jar support constructed in accordance with the invention.

Fig. 2 is a front view thereof.

Fig. 3 is an enlarged detail view of the tilting cradle or cage which receives the milk jar, portions of the trunnions being broken away.

Fig. 4 is a top plan view thereof.

Corresponding and like parts are referred to in the following description and indicated in all the views of the drawings by the same reference characters.

Referring to the drawings, which illustrate one embodiment of the invention, the numerals 1 designate a pair of spaced and similar standards which are rigidly connected at a point toward their lower ends by a cross bar 2. Each of the standards may be conveniently formed by doubling a bar or length of sheet material upon itself, the two thicknesses of material being suitably fastened or connected by rivets 3, and being flared at the lower end of each standard to provide an extended foot or base which serves to support the standard in an upright position. These flared or bifurcated bases 1ª of the standards are shown as provided with conventional casters or roller supports 4 so that the stand can be easily moved from place to place.

At a point toward the upper end of each of the standards the two thicknesses thereof are correspondingly crimped to provide a transverse bearing 5 within which trunnions 6 are journaled. In a similar manner the thicknesses of each standard are correspondingly crimped at points toward the lower ends of the standards to provide transverse sockets 7 which receive the ends of the cross bar 2, said sockets and cross bar having a square or polygonal cross section so that when the parts are assembled the standards are locked in a parallel relation to each other. Set screws 8 are threaded in the sides of the sockets 7 and provide a means for engaging the cross bar 2 to hold the standards rigidly in a proper relative relation to each other. It will be obvious, however, that by loosening the set screws the standards can be readily moved toward or away from each other as may be necessary to adjust the stand for use under various conditions.

The trunnions 6 are movable in and out within the bearings 5 so that the curved plates 9 which are applied to the ends thereof can be adjusted toward and away from each other. Set collars 10 are adjustable upon the trunnions 6, said collars being arranged to engage the inner ends of the bearings 5 and thereby prevent the trunnions from shifting longitudinally back and forth within the bearings when the parts are properly asembled and adjusted for use. Each of the plates 9 is provided at opposite ends thereof with curved clamping arms 11 which are adapted to fit around a milk jar or other container 12 which is supported between the swinging plates 9. These clamping arms 11 are preferably adjustably connected to the plates 9 so that they can be moved in and out and properly arranged to engage different sizes of jars. For this purpose each of the clamping arms 11 is shown as provided with a pair of hooked fingers 13 which project laterally therefrom and are adapted to interlock with any selected pair of openings 14 in the plate. The effective length of the clamping arms can thus be lengthened or shortened as may become necessary when adjusting the device to receive a large or a small jar, and the free ends of the arms terminate in corresponding outwardly projecting ears 15 which are connected by clamping bolts 16.

A bottom plate 17 is suspended from the tilting plates 9 by means of hangers 18, said hangers being preferably adjustable in length, and for this purpose being shown as constructed in sections which are connected by turn buckles 19. The milk jar or other container 12, rests upon the bottom plate 17 and is securely clamped in position between the tilting plates 9 by means of the clamping arms 11. The members carried by the trunnions 6 thus form a cage or cradle in which the milk jar is rigidly clamped, and which can be readily tilted at any time when it is desired to pour out the contents of the milk jar. A suitable handle 20 may be applied to one side of the cage, being shown in the present instance as projecting from the bottom plate 17. By grasping this handle the cage and milk jar can be easily tilted whenever it is desired to remove all or a portion of the contents of the jar. A heavy milk jar or crock can thus be manipulated by a woman or child without any of the injurious strain which would be incident to lifting the same.

Having thus described the invention, what I claim as new and desire to secure by Letters Patent, is:—

1. A support of the character described including a pair of standards provided with corresponding bearings, trunnions journaled within the bearings and adjustable longitudinally therein, tiltable plates upon the inner ends of the trunnions, clamping arms carried by the plates for engaging a jar arranged between the same, and bottom supporting means suspended from the plates.

2. A support of the character described including a pair of standards provided with corresponding bearings, trunnions journaled within the bearings and adjustable longitudinally therein, tilting plates carried by the inner ends of the trunnions, clamping arms adjustably connected to opposite ends of the tilting plates and adapted to fit around a jar supported between the plates, and clamping bolts connecting the ends of the clamping arms.

3. A support of the character described including a pair of standards provided with corresponding bearings, trunnions journaled within the bearings and movable longitudinally therein, tilting plates applied to the inner ends of the trunnions, a bottom plate suspended from the tilting plates, clamping arms adjustably connected to the ends of the tilting plates and adapted to extend around a jar resting upon the bottom plate, and clamping bolts connecting the ends of the clamping arms.

4. A support of the character described including a pair of standards provided with corresponding bearings, trunnions journaled within the bearings, tilting plates applied to the inner ends of the trunnions and provided at each end thereof with a series of openings, clamping arms carried by the ends of the plates and provided with hooked fingers adapted to interlock with selected openings, said clamping arms being adapted to extend around a jar arranged between the tilting plates, and clamping bolts connecting the free ends of the clamping arms.

5. A support of the character described, including a pair of standards provided with corresponding bearings, trunnions journaled within the bearings and adjustable longitudinally therein, tilting plates applied to the inner ends of the trunnions and provided at each end thereof with a series of openings, set collars adjustable on the trunnions and adapted to be arranged to engage the inner ends of the bearings, a bottom plate suspended from the tilting plates, clamping arms adjustably applied to the ends of the tilting plates and provided with hooked fingers adapted to interlock with selected openings therein, and clamping bolts connecting the free ends of the clamping arms.

In testimony whereof I have signed my name to this specification in the presence of two subscribing witnesses.

AARON W. TATE.

Witnesses:
HENRY F. REEVES,
ED DAVIS.